United States Patent [19]
Christensen et al.

[11] 3,873,547
[45] Mar. 25, 1975

[54] THE SALT OF 3-NITRO-9-AMINOACRIDINE AND -(CIS)-1,2-EPOXYPROPYLPHOSPHONIC ACID

[75] Inventors: Burton G. Christensen, Scotch Plains; Nathan G. Steinberg, Plainfield; Arthur A. Patchett, Cranford, all of N.J.

[73] Assignee: Merck & Co., Inc., Rahway, N.J.

[22] Filed: May 2, 1973

[21] Appl. No.: 356,525

[52] U.S. Cl....... 260/279 R, 260/348 R, 260/502.5, 424/257
[51] Int. Cl............................................. C07d 37/22
[58] Field of Search ............................... 260/279 R

[56] References Cited
UNITED STATES PATENTS

| | | | |
|---|---|---|---|
| 3,639,590 | 2/1972 | Hendlin et al. | 260/284 |
| 3,694,447 | 9/1972 | Pagano | 260/279 R |

Primary Examiner—Donald G. Daus
Assistant Examiner—Mary C. Vaughn
Attorney, Agent, or Firm—David L. Rose; J. Jerome Behan

[57] ABSTRACT

2-Fluorophosphanilic acid and (-)-cis,1,2-epoxypropylphosphonic acid salts of 3-nitro-9-aminoacridine possess broad-spectrum antibacterial activity. The activity of the salts is broader in spectrum than that of the individual components.

1 Claim, No Drawings

THE SALT OF 3-NITRO-9-AMINOACRIDINE AND -(CIS)-1,2-EPOXYPROPYLPHOSPHONIC ACID

SUMMARY OF THE INVENTION

This invention relates to salts of 2-fluorophosphanilic acid and (-)-cis,1,2-epoxypropylphosphonic acid with 3-nitro-9-aminoacridine. These salts have been found to possess broad spectrum antibacterial activity. The activity of the salts is greater than that which would be expected from individual use of the components.

It is thus an object of this invention to provide phosphonate salts which may be used for the treatment of bacterial infections. A further object is to provide a method for the preparation of such salts.

A still further object is to provide for compositions containing such salts for administration to subjects suffering from bacterial infections. Further objects will become apparent upon a reading of the complete disclosure.

DESCRIPTION OF THE INVENTION

2-Fluorophosphanilic acid has the following structure:

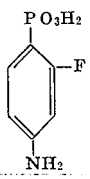

(-)-Cis-1,2-epoxypropylphosphonic acid has the following structure:

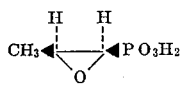

3-Nitro-9-aminoacridine has the following structure:

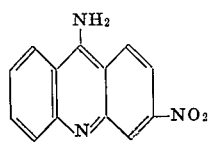

The above compounds are all known in the prior art and procedures for their preparations are published.

The preparation of 3-nitro-9-aminoacridine is described in an article by Albert et al. in the *Journal Of The Society of the Chemical Industry* 61 159 (1942). The preparation of (-)-cis-1,2-epoxypropylphosphonic acid is described in two consecutive articles in *Science* starting on page 122 of volume 166, (1969). The preparation of 2-fluorophosphanilic acid is described in U.S. Pat. No. 3,689,480.

The salt of 2-fluorophosphanilic acid with 3-nitro-9-aminoacridine is prepared by combining the starting materials in a solvent. The reaction is run at a temperature of from room temperature to 100° C. The reaction is essentially an acid/base neutralization and is complete in a very short time. However, generally the reaction mixture is stirred for from 5 minutes to ½ hour. It is preferred to use a polar solvent which appreciably dissolves both of the starting materials. Preferred solvents are loweralkanols, such as methanol, ethanol, propanol and the like; lower ketones as acetone, methyl, ethyl ketone and the like; dimethyl sulfoxide, N,N-dimethyl formamide and the like. The product is isolated by techniques known to those skilled in this art. The preferred technique, however, is to add sufficient hot water to just initiate precipitation of the salt and then slowly cooling the mixture to complete the precipitation.

The salt of (-)-cis-1,2-epoxypropylphosphonic acid with 3-nitro-9-aminoacridine is run in essentially the same manner as above. However, (-)-cis-1,2-epoxypropylphosphonic acid is not highly stable as the free acid and is generally obtained as a salt, such as the alkali metal or other salt form of cis-1,2-epoxypropylphosphonic acid is dissolved in a suitable solvent and treated with a base in order to liberate the free acid. Any mild base may be used, however, the most convenient method is to pass a solution of the salts through an ion exchange resin column which is capable of removing the alkali metal or other ion. One example of a suitable resin is AG 50 W-X2 marketed by Bio Rad Laboratories of Richmond, California. It has proven beneficial to maintain the column at from 0° to 10° C. in order to prevent decomposition of the unstable cis-1,2-epoxypropylphosphonic acid. Any of the aforementioned solvents may be employed, however, loweralkanols such as methanol or ethanol are preferred.

The solution of cis-1,2-epoxypropylphosphonic acid from the column is immediately treated with a solution of 3-nitro-9-aminoacridine in a solvent which may or may not be the same as the solvent from the column. The solvents which may be employed are the same as those enumerated above.

The reaction is again an acid-base neutralization and is complete on contact, however, the reaction may be stirred for from 5 minutes to ½ hours at from 0° C. to room temperature.

The salts of this invention are active against a wide variety of bacterial infections including both Gram-positive and Gram-negative bacteria. Tests in vitro against a number of microoganisms demonstrates the broad spectrum of activity of these salts. The tests are run by incorporating the salt at the desired concentration into a suitable culture medium, such as agar, and innoculating the test microoganism thereon. The test results are determined by noting the lowest concentration of the salt in the culture medium which totally inhibits the growth of the test microorganism. The lowest concentration which inhibits the growth of the test microorganism is commonly referred to as the Minimum Inhibitory Concentration (MIC). The results for the 2-fluorophosphanilic acid-3-nitro-9-aminoacridine salt (I) and the (-)-cis-1,2-epoxypropylphosphanilic acid-3-nitro-9-aminoacridine salt (II) are tabulated below.

MINIMUM INHIBITORY CONCENTRATION (In $\mu$mg/ml)

| Test Microorganism | Salt I | Salt II |
| --- | --- | --- |
| *Staphyloccocus aureus* | 1 | 1 |
| *Streptococcus pyogenes* | 1 | 1 |
| *Escherischia coli* | 10 | 10 |
| *Salmonella pullorum* | 10 | 10 |
| *Aerobacter aerogenes* | 10 | 10 |
| *Bordetella galliseptica* | 10 | 10 |
| *Pasteurella multocida* | 1 | 1 |
| *Proteus mirabilis* | 20 | 40 |
| *Klebsiella pneumoniae* | 10 | 10 |
| *Pseudomonas aeruginosa* | 20 | 1 |

The spectrum of the activities of the above salts is broader than the individual components. This is demonstrated by observing that against *Pseudomonas aeru-*

*ginosa* 3-nitro-9-aminoacridine has a MIC of 80 and (-)-cis-1,2-epoxypropylphosphonic acid as the sodium salt has a MIC of 200. Together as a salt the MIC is less than 1. Similar results are achieved with the salt of 2-fluorophosphanilic acid and 3-nitro-9-aminoacridine. This result is significant because *Pseudomonas aeruginosa* is a very important and a very difficult to eradicate microoganism. The superior activity of the above salts against this microoganism is a very significant event.

The above salts may be employed in compositions suitable for topical application to humans and animals for the control of surface bacteria; and they may be used in industrial applications for the inhibition of bacterial growth in aqueous systems.

For topical application the salts of this invention are combined with inert carriers which are compatible with the topical surface to which it is to be applied. Typically the salts may be formulated as antiseptic solutions, lotions, ointments, creams, pastes, and the like. Those skilled in the formulating art will be able to prepare these compositions without excessive experimentation. The composition for topical use will normally contain from 0.01 to 5% of the salt by weight. In certain cases it may be desirable to add to the compositions suspending agents, emulsifiers, dispersants and the like to aid in the preparation of uniform topical compositions.

In addition, the salts of this invention find utility in industrial application by controlling or eliminating the growth of susceptible microorganisms from industrial aqueous systems and from the surfaces of apparatus. Thus the salts of this invention can be used as antiseptic agents to remove susceptible microoganisms from pharmaceutical, dental, and medical equipment and other areas subject to infection. In addition, the salts of this invention can be incorporated in industrial aqueous systems and products to inhibit the growth of bacteria. Typical examples of aqueous systems and products which will benefit by the addition of salts of this invention are: Paper mill white water, cooling tower aqueous circulation systems, paints and other aqueous coatings, adhesives, sizings for textiles and paper products, and the like.

The salts of this invention are included in the above aqueous systems and products to the extent of from 0.1 to 10% by weight. It is generally preferred, however, to supply to the ultimate consumer a concentrate of the antibacterial agent in a suitable composition. This concentrate may contain from 5 to 90% of the antibacterial agent as a solid suspension, liquid dispersion or a solution in an aqueous or non-aqueous solvent. The concentrate can then be added to the aqueous system or product to the extent necessary to achieve a final concentration of 0.1 to 10%.

The following examples are provided so that the invention may be more fully understood. They are not to be construed as limitative of the invention.

EXAMPLE 1

Preparation of 3-Nitro-9-Aminoacridinium 2-Fluorophosphanilate 1.0 G. of 3-Nitro-9-aminoacridine is dissolved in 10 ml. of hot dimethylsulfoxide. To the hot solution is added 1.0 g. of 2-fluorophosphanilic acid in 10 ml. of hot dimethylsulfoxide. To the mixture is added 20 ml. of hot water. The mixture is allowed to cool to 10°C., whereby the product crystallizes to give 1.4 g. of a preparation of 3-nitro-9-aminoacridinium 2-fluorophosphanilate, m.p. 234°–236° C.

EXAMPLE 2

Preparation of the Cis-1,2-Epoxypropylphosphonic Acid Salt of 3-Nitro-9-Aminoacridine 1.0 G. of 3-nitro-9-aminoacridine is dissolved in 10 ml. of 95% ethanol. To the clear solution is added 745 mg. of (-)-cis-1,2-epoxypropylphosphonic acid monosodium salt, liberated as the free acid on an AG 50 W-X2 column precooled to 4° C.

When the starting material is completely eluted from the column into the ethanolic solution containing the 3-nitro-9-aminoacridine the reaction mixture is freeze dried overnight.

The yield of the preparation of the cis-1,2-epoxypropylphosphonic acid salt of 3-nitro-9-aminoacridine is 1.20 g. and the structure is elucidated by IR and nmr spectroscopy.

What is claimed is:

1. The salt of (-)-cis-1,2-epoxypropylphosphonic acid and 3-nitro-9-aminoacridine.

* * * * *